Dec. 17, 1929.  J. R. HENKLE  1,740,299
PORTABLE JACK
Filed May 16, 1927   2 Sheets-Sheet 2
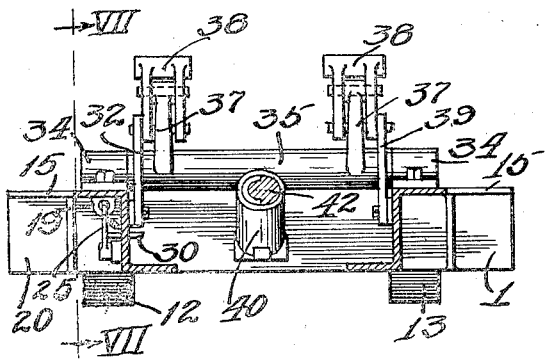
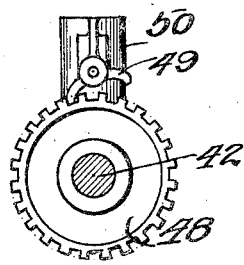
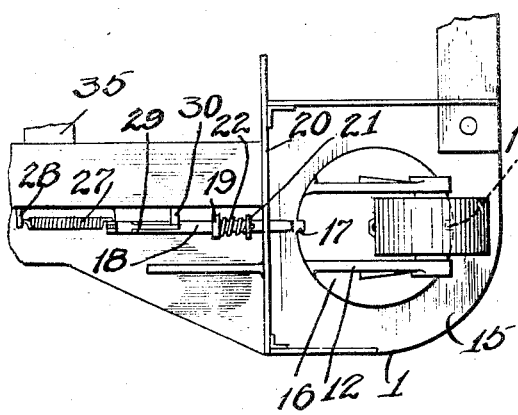
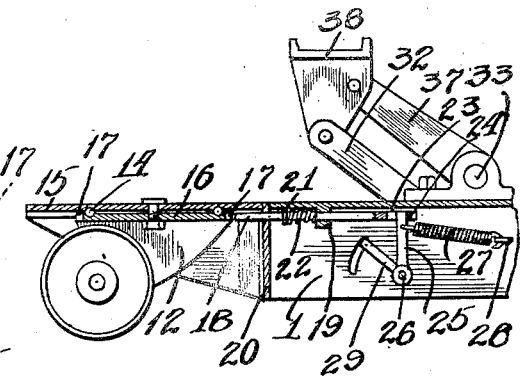
INVENTOR
John R. Henkle Patented Dec. 17, 1929

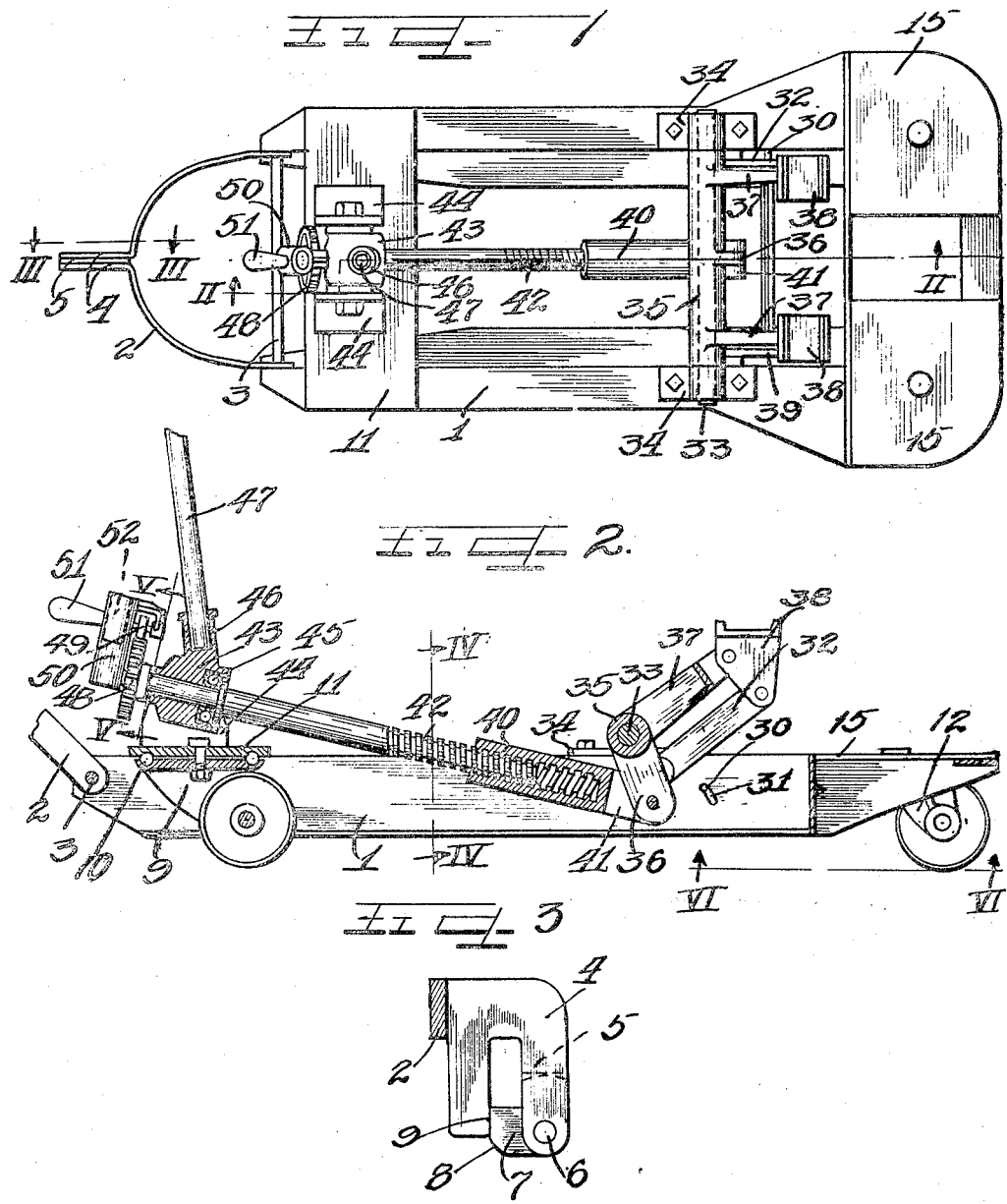

1,740,299

UNITED STATES PATENT OFFICE

JOHN R. HENKLE, OF CHICAGO, ILLINOIS, ASSIGNOR TO MERCURY MANUFACTURING COMPANY, A CORPORATION OF ILLINOIS

PORTABLE JACK

Application filed May 16, 1927. Serial No. 191,687.

This invention relates to a portable trailer jack adapted to be removably engaged beneath the front or rear axle of a vehicle to elevate one end of the vehicle, thereby permitting the trailer jack to be pulled over the ground by means of a motor truck or other suitable means to move the vehicle from one place to another.

It is an object of this invention to provide a portable trailer jack of substantial construction provided with suitable screw operated means for jacking up one end of a vehicle and, furthermore, being provided with rollers permitting the jack mechanism to be used as a portable support for one end of the vehicle to permit the vehicle to be transported from one place to another.

It is also an object of this invention to provide a portable jack of the trailer type having pivoted roller casters and a pivoted jack mechanism adapted to be operated by means of telescoping screw members operable by means of a rotatable crank.

It is a further object of this invention to provide a portable jack supported on pivoted roller mechanisms having a pivoted bail at one end thereof and also provided with a bell crank jack arrangement operable by means of a crank controlled screw and threaded sleeve connected to said bell crank jack arrangement.

It is furthermore an object of this invention to provide a portable jack having a substantial frame supported on roller casters, one of which is provided with a locking mechanism to hold the same against rotation, said frame also having mounted thereon a screw operated bell crank jack device having means connected therewith for controlling the locking mechanism associated with the rotatable casters hereinbefore mentioned.

It is an important object of this invention to provide a portable jack consisting of a substantial metal frame supported on rotatable casters, one of which is provided with a locking mechanism to facilitate steering of the jack, said locking mechanism being controlled by the operation of a jacking device pivotally supported on the frame and operable by a crank mechanism and a screw device connecting said crank mechanism with the jacking device.

Other and further important objects of this invention will be apparent from the disclosures in the specification and the accompanying drawings.

This invention (in a preferred form) is illustrated in the drawings and hereinafter more fully described.

On the drawings:

Figure 1 is a top plan view of a portable jack embodying the principles of this invention.

Figure 2 is a longitudinal fragmentary section taken on line II—II of Figure 1, with parts shown in elevation.

Figure 3 is an enlarged detail sectional view taken on line III—III of Figure 1, illustrating the latch hook provided on the pivoted bail connected to one end of the jack frame.

Figure 4 is a transverse vertical section taken on line IV—IV of Figure 2.

Figure 5 is an enlarged detail view taken on line V—V of Figure 2.

Figure 6 is a fragmentary bottom plan view of one of the rear corners of the portable jack taken on line VI—VI of Figure 2.

Figure 7 is a longitudinal vertical sectional view taken on line VII—VII of Figure 4.

As shown on the drawings:

The reference numeral 1 indicates a heavy metal chassis or frame on the front end of which a draw yoke or bail 2 is pivotally mounted by means of a cross rod or shaft 3. The bail 2 comprises two curved arms the ends of which are bent outwardly at substantially right angles and form an inverted U-shaped head plate 4, one arm of which is longer than the other. The two head plates are separated by means of a U-shaped spacing plate 5 with one arm thereof shorter than the other and positioned between the long arms of the head plates 4, thereby leaving a space between the lower ends of the long arms of said head plates. Pivotally mounted on a pin 6 in the space between the lower ends of the long arms of the head plates 4 is a locking tongue 7, the free end of which is rounded at one corner, as designated by the reference numeral 8, to permit the locking tongue to swing outwardly into a horizontal locking position, as shown in Figure 3, with the straight edge 9 of said locking tongue seated against the longer arm of the separating plate 5. This arrangement affords a suitable means whereby the hook shaped end of the bail or yoke 2 is adapted to be engaged in a pulling ring secured to a motor truck or other suitable means for pulling the portable jack. After the hooked end of the bail is engaged on a ring member of a truck, as described, the locking tongue 7 is adapted to be moved downwardly into locking position, as shown in Figure 3, to hold the hooked end of the bail locked with the pulling truck ring to prevent accidental disconnection of the portable jack from the device which is pulling the same.

The jack frame 1 is provided with a rotatable front roller caster 9 having a ball bearing 10 positioned between the caster bracket and a transverse front top plate 11 forming a part of the jack framework. The front caster is positioned under the middle front portion of the frame 1. Pivotally supported under the rear corners of the framework 1 are rear rotatable casters 12 and 13, each of which is provided with a ball bearing 14 positioned between the caster bracket and the rear corner plates 15 forming part of the framework 1. The circular top plate 16 of the rear caster 12 is provided with a pair of diametrically opposite notches 17 positioned in line with the middle longitudinal plane of the roller of said caster. The notches 17 are provided in the caster 12 for the purpose of locking the same against rotation with respect to the framework 1 so that the portable jack may be conveniently steered into place. The notched plate of the caster 12 is adapted to be locked by means of a slidable bolt or rod 18 which is slidably mounted beneath one side of the frame 1 in an apertured guide lug 19 secured on the under side of one of the frame sills. The locking bolt 18 also projects through an aperture in a transverse web plate 20 forming part of the framework 1. Secured on the locking bolt 18 between the apertured guide lug 19 and the web plate 20 is a collar or disk 21. Coiled around the locking bolt 18 between the apertured guide lug 19 and the collar 21 is a coiled spring 22 which acts to slidably project the locking bolt into locking engagement with one of the notches 17 of the rear caster plate 16. The forward or inner end of the locking bolt 18 is provided with a slot 23 having a pin 24 projecting transversely through the end thereof. Engaged in the slot 23 to the inside of the pin is a long arm 25 of a control bell crank which is pivotally mounted at 26 in the outer face of one of the chassis frame sills. Connected to the long bell crank arm 25 is one end of a coiled control spring 27, the other end of which is secured to a ring or screw eye 28 engaged in one of the chassis frame sills. The coiled spring 27 is stronger than the coiled spring 22 and, therefore, normally acts to hold the latch bolt 18 in a retracted or released position, as shown in Figures 6 and 7. The bell crank member also has a short bell crank arm 29 in the end of which a pin 30 is secured at right angles to permit said pin to project through a curved guide slot 31 mounted in one of the chassis frame sills. The pin 30 is provided to permit the latch bolt 18 to be projected into locking engagement with one of the notches 17 of the caster 12 to hold said caster against rotation with respect to the framework 1. The control pin 30 is operable by means of a connecting bar or toggle 32, as hereinafter more fully described.

The jacking device proper is mounted upon the framework 1 on a transverse shaft 33 mounted in suitable bearing brackets 34 secured to the top rear portion of the framework 1. Pivotally mounted on the shaft 33 is a bell crank sleeve 35 having integrally formed at right angles to the middle portion thereof a short lower bell crank arm 36. Also integrally formed on the bell crank sleeve 35 on opposite sides of the intermediate or middle bell crank arm 36 are two long bell crank jack arms 37. Pivotally mounted on the upper end of each of the long bell crank arms 37 is a grooved or recessed jack shoe 38 to one of which the upper end of the connecting bar 32 is pivotally connected. Pivotally connected to the other jack shoe 38 is one end of a connecting bar or toggle 39, the lower end of which is pivotally connected to the framework 1, as illustrated in Figure 4. The connecting toggles 32 and 39 act to hold the upper grooved portions of the jack shoes 38 in a horizontal position at all times regardless of the position of the jack bell crank mechanism. It will also be noted that the toggle bar 32 is adapted to coact with the pin 30 to control the operation of the locking bolt 18, when the bell crank arms 37 are swung downwardly from the position shown in Figure 2 to lower the jack shoes into a position to permit the same to be engaged underneath an axle of a vehicle or other device which is to be raised.

The jack bell crank mechanism is adapted to be operated by means of a screw device consisting of an internally threaded transmission sleeve or hollow shaft 40, one end of which is open and the other end of which is closed and provided with a pair of spaced lugs 41 which are pivotally connected to opposite sides of the intermediate or middle bell crank arm 36. Threaded into the internally threaded sleeve 40 is one end of a screw shaft 42 which projects upwardly at an angle and has the upper end reduced in diameter and projecting through a bearing block 43 rigidly supported on brackets 44 secured upon the top of the transverse frame plate 11. Mounted in a recess of the bearing block 43 is a thrust ball bearing 45. Integrally formed on the bearing block 43 is an upwardly projecting socket 46 in which a lever or handle bar 47 is adapted to be removably carried. Mounted on the upper projecting end of the screw shaft 42 is a ratchet 48 with which a double acting pawl 49 is adapted to coact. The double acting pawl 49 is mounted on one side of a crank 50 provided with a handle 51 to facilitate rotation of the crank 50 and the screw shaft 42. The upper end of the crank 50 is provided with a recess or pocket 52 for the purpose of removably receiving one end of the lever or handle bar 47 when it is necessary to have a greater leverage for the purpose of rotating the screw shaft 42. The socket 46 is merely provided for carrying the lever or handle bar 47 when not in use.

The operation is as follows:

The portable jack is provided with the pivoted bail 2 to permit the hooked end of said bail to be removably engaged by a motor truck or other device to permit the portable jack to be pulled over the ground. The hooked end of the bail 2 is adapted to be locked on a pulling ring or other suitable device by means of the pivoted latch lug 7 which is shown in a locking position in full lines in Figure 3 so that there will be no danger of the hooked head of the bail from becoming detached. When the jacking mechanisms mounted upon the jack frame 1 are to be used the handle 51 of the crank 50 is used to turn the crank so that the pivoted pawl 49 will cause rotation of the ratchet 48, thereby causing the screw shaft 42 to be rotated to pull the internally threaded sleeve shaft 40 forwardly, thereby swinging the intermediate jack bell crank arm 36 forwardly to cause the long bell crank jack arms 37 to swing downwardly from the raised position shown in Figure 2 to cause the jack shoes 38 to be lowered. As the jack shoes are lowered the connecting bars or links 32 and 39 serve to maintain the upper grooved portions of the jack shoes in a horizontal position. When the jack bell crank has been lowered a predetermined amount the connecting link 32 is brought into engagement with the pin 30, thereby causing the bell crank 25—29 to be operated against the action of the spring 27 so that the long arm 25 of said bell crank acts to project the locking bolt 18 rearwardly into latching engagement into one of the notches 17 of the rear caster 12, thereby holding said caster against rotation with respect to the jack frame 1. This arrangement permits the portable jack to be pushed in a straight line to position the lowered jack shoes 38 beneath the front axle of an automobile or other device which is to be raised. With the lowered jack shoes in position the crank 50 is rotated in an opposite direction by means of the handle 51 to cause the screw shaft 42 to be rotated outwardly in the shaft sleeve 40, thereby causing the jack bell crank to be operated to gradually raise the jack shoes 38 to cause the same to elevate the front axle of the vehicle and lift the entire front end of said vehicle off of the ground. As described, it will be noted that the front end of the vehicle is supported by the jack shoes 38 upon the portable jack mechanism so that the jacked up vehicle may be readily towed with the portable jack acting as a suitable roller support for one end of the vehicle. In case the leverage afforded by the handle 51 on the crank 50 is insufficient to permit a heavy vehicle or other device to be elevated, the lever or handle bar 47 may be removed from the socket 46 and engaged in the pocket 53 provided in the upper end of the crank 50. This arrangement permits a greater leverage to be exerted upon the screw shaft mechanisms so that the bell crank jack device may be operated to raise the heavy device. With the raising of the jack shoes 38 the connecting link 32 is moved out of engagement with the pin 30, thereby causing the control spring 27 acting on the long bell crank arm 25 to pull the latch bolt 18 out of latching engagement with the caster 12 against the action of the coiled spring 22. It will thus be noted that when the jack mechanisms are in an elevated position that the latch bolt 18 is released to permit the caster 12 to rotate with respect to the jack frame 1 and that when the jack shoes are in lowered position the latch bolt locks the caster 12 against rotation so that the portable jack may be conveniently pushed in a straight line underneath the device which is to be elevated.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. A portable jack comprising a frame, roller casters pivotally mounted thereon, a jack mechanism on said frame, a screw device connected therewith, a latching mechanism associated with one of said roller casters and controlled by the operation of said jack mechanism, a pawl and ratchet mechanism connected with said screw device, and a crank for operating said pawl and ratchet mechanism to cause operation of the jack mechanism by said screw device.

2. A portable jack comprising a frame, supporting casters pivotally mounted thereon, means for locking one of said casters, a jack mechanism on said frame, means carried thereby for controlling the operation of said locking means, a screw shaft connected to operate said jack mechanism, and pawl and ratchet means connected with said screw shaft to permit elongation or shortening thereof to respectively raise or lower the jack mechanism.

3. A portable jack comprising a frame, a caster pivotally mounted thereon, a locking device on said frame for holding the caster against rotation, a screw jack mechanism on said frame, means for operating the jack mechanism, and a member forming part of said jack mechanism adapted to operate said locking device to move the same into latching engagement with said rotatable caster when the jack mechanism is lowered.

4. A portable jack comprising a frame, a plurality of pivoted casters mounted thereon, a screw shaft mechanism on said frame, means for operating the same, and a locking device for one of said casters adapted to be operated by said screw shaft mechanism.

5. The combination with a portable jack frame, of a caster pivotally mounted thereon, a slidable spring controlled latch mechanism mounted to coact with said caster and adapted to hold the same against rotation with respect to said frame, and a screw operated jack mechanism mounted on said frame controlling the operation of said latch mechanism.

In testimony whereof I have hereunto subscribed my name.

JOHN R. HENKLE.